US008942243B2

(12) United States Patent
Wänstedt et al.

(10) Patent No.: US 8,942,243 B2
(45) Date of Patent: *Jan. 27, 2015

(54) ADAPTIVE RATE CONTROL IN A COMMUNICATIONS SYSTEM

(71) Applicant: Telefonaktiebolaget L M Ericsson (publ), Stockholm (SE)

(72) Inventors: Stefan Wänstedt, Luleå (SE); Daniel Enström, Gammelstad (SE); Ghyslain Pelletier, Laval (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/106,594

(22) Filed: Dec. 13, 2013

(65) Prior Publication Data

US 2014/0105026 A1    Apr. 17, 2014

Related U.S. Application Data

(63) Continuation of application No. 12/668,229, filed as application No. PCT/SE2008/050853 on Jul. 9, 2008, now Pat. No. 8,625,608.

(60) Provisional application No. 60/948,514, filed on Jul. 9, 2007, provisional application No. 60/956,241, filed on Aug. 16, 2007.

(51) Int. Cl.
*H04L 12/28* (2006.01)
*H04L 12/815* (2013.01)
*H04L 12/801* (2013.01)
*H04L 12/825* (2013.01)

(52) U.S. Cl.
CPC ............... *H04L 47/22* (2013.01); *H04L 47/10* (2013.01); *H04L 47/14* (2013.01); *H04L 47/25* (2013.01); *H04L 47/263* (2013.01); *H04L 47/29* (2013.01); *Y02B 60/31* (2013.01)
USPC ............. 370/395.64; 370/395.61; 370/395.65

(58) Field of Classification Search
USPC .......................... 370/395.61, 395.64, 395.65
See application file for complete search history.

(56) References Cited

U.S. PATENT DOCUMENTS 6,052,734 A * 4/2000 Ito et al. .......................... 709/235
6,597,699 B1 * 7/2003 Ayres ............................... 370/400
6,654,417 B1 * 11/2003 Hui ............................ 375/240.03
7,457,623 B2 * 11/2008 Naghian et al. ............... 455/439

(Continued)

FOREIGN PATENT DOCUMENTS

WO    WO 2006135334 A2 * 12/2006

*Primary Examiner* — Benjamin H Elliott, IV
(74) *Attorney, Agent, or Firm* — Coats & Bennett, PLLC

(57) ABSTRACT

The invention relates to a method for controlling a bit-rate of a session in a packet-switched communications system where multiple sessions are set-up via a shared resource. A current bit-rate of the session is compared to a bit-rate range valid for the session to determine a distance from the position of the current bit-rate to one of the end-points of the bit-rate range. The current bit-rate is then adapted differently depending on the distance to the selected end-point. By controlling the bit-rate of each session that is set-up via the shared resource for applications that provide delay-sensitive services to users in this way the method and corresponding system and sender-receiver arrangements have the effect that rate adaptations can be distributed among the applications so that users share responsibility for rate adaptations.

26 Claims, 9 Drawing Sheets

(56) References Cited

U.S. PATENT DOCUMENTS

| | | | |
|---|---|---|---|
| 7,573,856 B2* | 8/2009 | Chen et al. | 370/338 |
| 7,643,417 B2* | 1/2010 | Van Nieuwenhuizen | 370/232 |
| 8,625,608 B2* | 1/2014 | Wanstedt et al. | 370/395.64 |
| 2003/0198184 A1* | 10/2003 | Huang et al. | 370/231 |
| 2004/0052212 A1* | 3/2004 | Baillargeon | 370/235 |
| 2004/0071145 A1* | 4/2004 | Ha et al. | 370/395.43 |
| 2005/0117583 A1* | 6/2005 | Uchida et al. | 370/395.4 |
| 2007/0214247 A1* | 9/2007 | Yang et al. | 709/223 |
| 2008/0240251 A1* | 10/2008 | Gioia et al. | 375/240.19 |
| 2010/0195521 A1* | 8/2010 | Wanstedt et al. | 370/252 |
| 2014/0105026 A1* | 4/2014 | Wanstedt et al. | 370/236 |

* cited by examiner

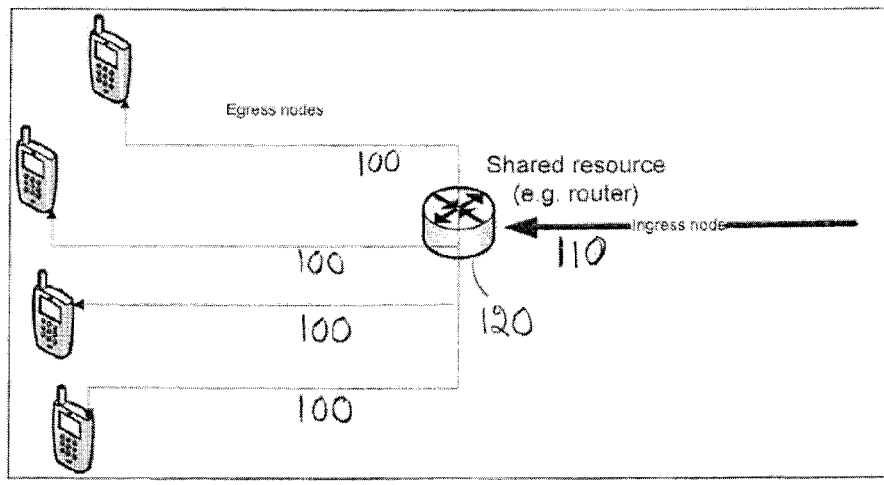
Figure 1    Example ingress and egress nodes of a shared resource.
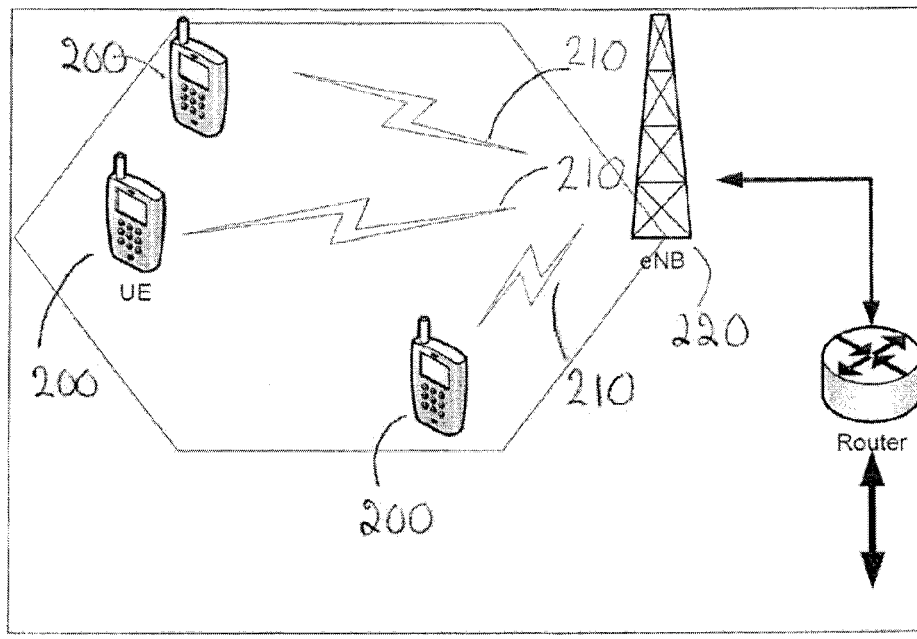
Figure 2    LTE cell in a mobile network.

Figure 5   Example deployment in LTE network. Time in figure, t=T3.

Figure 10  Process flow chart.

Figure 11  Flow chart for bit-rate request estimation.

Figure 12 Session flow diagram.

ADAPTIVE RATE CONTROL IN A COMMUNICATIONS SYSTEM

CROSS-REFERENCE TO RELATED APPLICATIONS

This application is a continuation of U.S. patent application Ser. No. 12/668,229, which is the National Stage of International Application No. PCT/SE2008/050853, filed Jul. 9, 2008, which claims the benefit of U.S. Provisional Patent Application Ser. No. 60/948,514 filed Jul. 9, 2007, and U.S. Provisional Patent Application Ser. No. 60/956,241 filed Aug. 16, 2007, all of which are incorporated by reference herein in their entirety.

TECHNICAL FIELD

The present invention relates to methods and arrangements for rate control in digital communications systems.

BACKGROUND

In a digital packet-switched communications system different types of traffic, e. g., voice, data, audio and video, may be conveyed between multiple parties via shared resources, e g routers or transmission channels. Some traffic, such as many audio and video applications, typically occurs in real time, whereas other traffic, such as many data applications, typically is non-real time traffic.

In such a system a sender is an application or entity that encodes and sends media, that has been received from a sending party, to a receiver. A receiver is an application or entity that receives, decodes and presents media to a receiving party. An application, acting as a sender or as a receiver or both, may be located in a client or on a server, e. g., in user equipment or other hardware of a sending or a receiving party. An application can be run in a client or on a server to provide or deliver a service, e. g., to a user or other party. More specifically, an application can run on a server to encode and send media to a client, where an application is running to receive, decode and present the media to a user, whereby the applications running on the server and in the client function to provide a service to the user. A service may involve one or several media types, e. g., voice and data, or video and audio.

Different transmission requirements apply for real-time traffic compared to non-real time traffic. For example, non-real time traffic such as file transfer does not allow packet loss, i e packets of data that are not received correctly at the receiving end, but is less sensitive to transmission delay than real-time traffic. Real-time traffic, on the other hand, can tolerate some packet loss but is more sensitive to transmission delay than non-real time traffic. Therefore different types of transmission protocols have been designed to comply with the needs of real-time traffic and non-real time traffic respectively. One example of a protocol adapted to fulfill the requirements of non-real time traffic is Transmission Control Protocol (TCP), and one example of a protocol adapted to fulfill the requirements of real time traffic is User Datagram Protocol (UDP). A typical use of UDP is for real-time critical data such as Voice over IP (VoIP) and streaming media. Another use of UDP is for signalling control data for on-line games.

FIG. 1 shows an example of a shared resource 120 having an ingress node 110 and multiple egress nodes 100. It is a well-known fact that packet-switched networks utilizing shared resources between the users can experience congestion. Congestion will happen when the sum of traffic of the ingress nodes, i.e., the entry points, of the shared resource exceeds the sum of the traffic of the egress nodes, i.e., the exit points, of the same shared resource. The most typical example is a router with a specific number of connections. Even if the router has processing power enough to re-route the traffic according to the link throughput, the currently available link throughput might restrict the amount of traffic the outgoing links from the router can cope with. Hence, the buffers of the router will build up and eventually overflow. The network now experiences congestion and the router is forced to drop packets.

Another example of congestion can be found when studying wireless networks with shared channels such as Wireless Local Area Network (WLAN) specified in IEEE 802.11 a/b/g, or mobile networks such as High-Speed Packet Access (HSPA), Long-Term Evolution (LTE) and Worldwide Interoperability for Microwave Access (WiMAX). In these networks, at least the downlink is shared between the users and is by that a possible candidate to experience congestion. In, e.g., the case of LTE, shown in FIG. 2, the eNB base station 220 will manage re-transmissions on the Medium Access Control (MAC) layer over transmission channels 210 to the mobile terminal or User Equipment (UE) 200 which will have impact on the amount of traffic the eNB base station at any given moment can provide throughput for. The more re-transmissions required for successful reception at the UE, the less available power for providing throughput for other users, thereby making the use of the transmission capacity of the shared resource less efficient.

The normal behavior for any routing node is to provide buffers that can manage a certain amount of variation in input/output link capacity and hence absorb minor congestion occurrences. However, when the congestion is severe enough, the routing node will eventually drop packets.

For TCP traffic, a dropped packet will be detected by the sender since no Acknowledge (ACK) is received for that particular packet and a re-transmission will occur. Further, the TCP protocol has a built in rate adaptive mechanism which will lower the transmission bit-rate when packet losses occur and re-transmissions happen on the Internet Protocol (IP) layer. If an ACK is not received within a specific time interval, set by a re-transmission time-out value, the data is retransmitted. The TCP retransmission time-out value is dynamically determined for each connection, based on round-trip time. At the receiver, sequence numbers are used to correctly order segments that may be received out of order and to eliminate duplicates. TCP governs the amount of data sent by returning a window with every acknowledgement to indicate a range of acceptable sequence numbers beyond the last segment successfully received. The window indicates an allowed number of octets that the sender may transmit before receiving further permission. Since this flow control is built into the protocol itself, TCP provides a rate adaptive mechanism independently of whatever application that uses it. This mechanism has the effect that the transmission bit-rate can be reduced stepwise when congestion occurs, and also that it can be increased stepwise when congestion ceases.

To further increase the performance of routing nodes, a scheme called "Explicit Congestion Notification (ECN) for IP" has been developed, specified in IETF specification RFC 3168, which is hereby incorporated in its entirety by reference. As shown in FIG. 3, this scheme utilizes two bits, ECN bits 300 in the Type Of Service (TOS) field 310, in the IP header 320 to signal the risk for congestion-related losses. The field has four code points where two are used to signal ECN capability and the other two are used to signal congestion. The code point for congestion is set in, e.g., routers and when the receiver has encountered a congestion notification it propagates the information to the sender of the stream which then can adapt its transmission bit-rate. For TCP, this is done by using two, previously reserved, bits in the TCP header. When received, these bits trigger the sender to reduce its transmission bit-rate.

UDP traffic has no similar generic mechanism for reliable transmission and flow control. UDP traffic is by definition non-reliable in the sense that the delivery is not guaranteed. Lost UDP packets will not be re-transmitted unless the application has some specialized feature which allows this. UDP by itself does not respond in any way to network congestion, and the transmission rate is determined by the application, not by UDP itself.

ECN is defined for IP usage with any transport protocol. Hence, ECN for UDP is not excluded in the specification for ECN, IETF RFC 3168, although it is only specified in terms of using with TCP traffic. UDP by itself has no mechanism to change its transmission behavior based upon the reception of a congestion notification message. Without this mechanism, ECN for UDP becomes highly unreliable since the effect of setting the ECN bits in the IP header cannot be predicted. ECN for UDP needs the same generic mechanisms as ECN for TCP; a fast back-channel for signalling feedback from the receiver to the sender regarding the received transmissions and a rate control algorithm for changing the transmission bit-rate dynamically.

As delay-sensitive communication services, such as UDP based real-time communication services, may also be quite sensitive to packet loss there is a need to manage the transmissions via shared resources for such services so that congestion can be alleviated or avoided and/or to make efficient use of the transmission capacity of the shared resource, e g when increasing the traffic after that congestion has ceased. The transmissions via shared resources can be managed by controlling the transmission bit-rate of the applications providing the services via the shared resources. However, controlling the transmission bit-rate of the applications will impact the transmission delay. Whereas a less delay-sensitive service will still be working although delivered at a slower pace if the transmission bit-rate is reduced, the consequence for a delay-sensitive service may be that the service cannot be seen as working if a too drastic reduction of the transmission bit-rate is performed.

SUMMARY

It is an object of at least some embodiments according to the invention to provide a rate control mechanism that is capable of making use of the transmission capacity of a shared resource while also functioning to accommodate the various needs of delay-sensitive services that use the shared resource in an adequate and balanced way.

According to a first aspect, the object is achieved by providing a method for controlling a bit-rate of a session in a packet-switched communications system where multiple sessions are set-up via a shared resource. First a bit-rate range valid for the session is determined. The bit-rate range is or may be confined by an upper limit or end-point and a lower limit or end-point. A distance to a selected limit, i e to the upper limit or to the lower limit, of the bit-rate range is determined by comparing a current bit-rate of the session to the bit-rate range. The current bit-rate is then adapted differently depending on the distance to the selected limit. The current bit-rate may in one embodiment be adapted by an amount that is larger if the distance is small and smaller if the distance is large. For example, if the selected limit is the upper limit of the bit-rate range, the current bit-rate is adapted by a larger reduction or a smaller increase if the distance to the selected limit is small and by a smaller reduction or larger increase if the distance to the selected limit is large. If on the other hand the selected limit is the lower limit of the bit-rate range, the current bit-rate is adapted by a larger reduction or a smaller increase if the distance to the selected limit is large and by a smaller reduction or larger increase if the distance to the selected limit is small.

According to a second aspect, the object is achieved by providing a packet-switched communications system for controlling bit-rates of at least a first and a second session. The system comprises at least a first sender operable to communicate with a first receiver via a shared resource in the first session and a second sender operable to communicate with a second receiver via the shared resource in the second session. Further, the system comprises first bit-rate range determining means for determining a first bit-rate range valid for the first session and second bit-rate range determining means for determining a second bit-rate range valid for the second session. The first bit-rate range and the second bit-rate range are or may be confined by a respective upper limit or end-point and a respective lower limit or end-point. The system also comprises a first rate adaptation control unit for controlling rate adaptation of a first current bit-rate of said first session so that the first current bit-rate is adapted differently depending on a first distance to a selected limit, i.e., to the upper limit or to the lower limit, of the first bit-rate range and a second rate adaptation control unit for controlling rate adaptation of a second current bit-rate of said second session so that the second current bit-rate is adapted differently depending on a second distance to a selected limit, i.e., to the upper limit or to the lower limit, of the second bit-rate range. The first current bit-rate and second current bit-rate may in one embodiment be adapted by first and second amounts that are larger if the respective distance is small and smaller if the respective distance is large.

According to a third aspect, the object is achieved by providing a receiver for receiving packet-switched encoded media that is transmitted by a sender in a session via a shared resource. The receiver comprises bit-rate range determining means for determining a bit-rate range valid for the session. The bit-rate range is or may be confined by an upper limit or end-point and a lower limit or end-point. The receiver further comprises bit-rate request estimation means and rate request means. The bit-rate request estimation means operate to estimate a bit-rate adaptation by comparing a currently received bit-rate to the bit-rate range to determine a distance to a selected limit, i. e., to the upper limit or to the lower limit, of the bit-rate range and estimating the bit-rate adaptation differently depending on the distance. The thus estimated bit-rate adaptation may in one embodiment be larger if the distance is small and smaller if the distance is large. The rate request means operate to request the sender to adapt a currently transmitted bit-rate in said session by sending a rate adaptation request message. The rate adaptation request message may in a further embodiment be sent upon reception of a congestion notification message from the shared resource.

According to a fourth aspect, the object is achieved by providing a sender for transmitting packet-switched encoded media in a session via a shared resource to a receiver. The sender comprises bit-rate range determining means for determining a bit-rate range valid for the session. The bit-rate range is or may be confined by an upper limit or end-point and a lower limit or end-point. The sender further comprises rate request reception means and a rate adaptation control unit. The rate request reception means operate to receive requests from the receiver to adapt a currently transmitted bit-rate in the session. The rate adaptation control unit operate to control adaptation of the currently transmitted bit-rate in the session so that the currently transmitted bit-rate is adapted differently depending on a distance to a selected limit, i.e., to the upper limit or to the lower limit, of the bit-rate range. The currently transmitted bit-rate may in one embodiment be adapted by an amount that is larger if the distance is small and smaller if the distance is large. The rate adaptation may be done upon reception of a request in form of a rate adaptation request message from the receiver.

By controlling the bit-rate of each session that is set-up via the shared resource for applications that run in clients to provide delay-sensitive services to users in this way the method, system and sender-receiver arrangements have the effect that rate adaptations can be distributed among the applications so that users share responsibility for rate adaptations.

Further, by performing rate adaptations within a for each service defined bit-rate range the method, system and sender-receiver arrangements have the effect of enabling that the intents of the services can be maintained while the respective rates of the services are adapted.

One advantage of at least some embodiments of the invention is that responsibility for adapting transmission rate when congestion occurs in a network node is shared more fairly between new users, that have not taken any action to alleviate the congestion, and users that have already reduced their bit-rate due to previous congestion notification messages.

Another advantage is that the distribution of the rate adaptation functionality to the clients removes the need or requirement for user tracking and service awareness at the congested network node.

BRIEF DESCRIPTION OF THE DRAWINGS

The invention, together with further objects and advantages thereof, may be more readily understood by making reference to the following description taken together with the accompanying drawings, in which:

FIG. 1 illustrates an example of a shared resource that may be subject to congestion;

FIG. 2 illustrates a further example of a shared resource that may be subject to congestion;

DETAILED DESCRIPTION

At least some of the embodiments according to the invention provides for a more fair or equal share distribution of rate adaptation among users of a particular routing function by taking a current session bit-rate of a user application, including its relation to an initial session set-up bit-rate, into consideration at rate adaptation. A mechanism is provided to guide a response to a congestion notification message so that users in the same network priority class experience similar quality degradations. This means that a new user which has just initiated its session, say at e.g. 100 kbps, would be required to lower its bit-rate in a different way than a user which already, when receiving some previous congestion notification message, has lowered its bit-rate from e.g. 100 kbps to 50 kbps.

To ensure that the intent of a service can be maintained, the inventors have realized that a defined range of bit-rates between which the service is regarded as functioning or working is needed as modern media codecs have the possibility to tune into a discrete set of bit-rates, in some cases even any given bit-rate, but it is not certain that the intent of the service can be maintained at any given bit-rate; e.g., a real-time video session requires bit-rates in the order of 100 kbps. Although the video codecs used in such a session have the possibility to reduce the bit-rate to 10 kbps, the service is clearly not a conversational video session at 10 kbps. At this bit-rate, it would be perceived as a slow slide show; not the real-time conversational service stated by the service requirements. In this case, you could say that the valid bit-rates for the service are between ~40 and 100 kbps.

For other media types, the valid bit-rate range might look different, but the underlying principle is the same: there is need for a certain span or range of bit-rates in which the service can be determined to be valid.

The inventors have further realized that, by specifying how applications should respond to setting of the ECN bits in the IP header, reliable use of ECN with UDP is enabled for real-time communication services, such as IMS Multimedia Telephony (MTSI), that are provided with a fast back-channel from the receiver to the sender and possibility to change transmission bit-rate dynamically.

Figure 3:
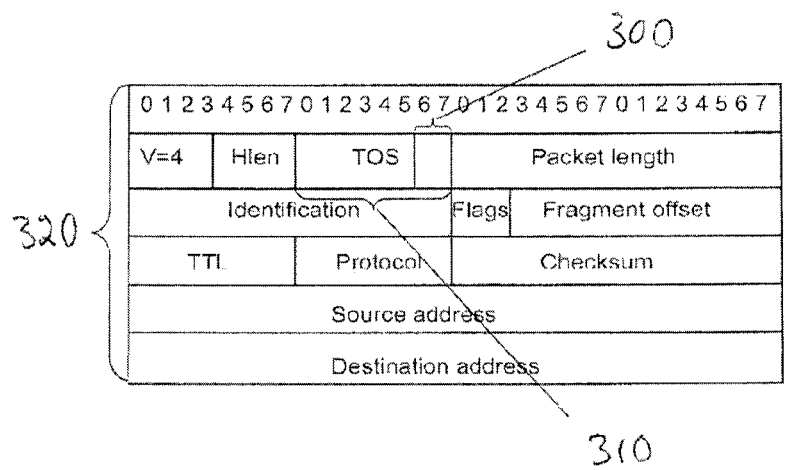
FIG. 3 is an illustration of an IP header with ECN bits according to IETF specification RFC 3168.
Figure 4:
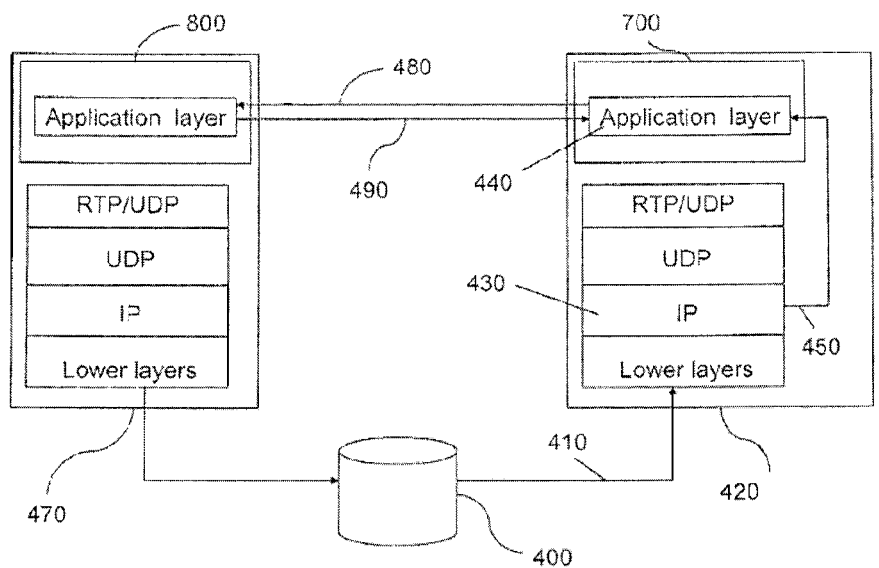
FIG. 4 is a schematic illustration of an embodiment of a rate adaptation mechanism according to the invention.

FIG. 4 illustrates the application behavior required for using ECN with UDP traffic. Protocol stacks of a sending client 470 and a receiving client 420 that communicate via a shared resource 400, here in the form of a router, are shown. In accordance with an ECN scheme for IP, the shared resource 400 sets ECN bits 300 in an IP header of a UDP packet that is forwarded over a connection 410 to the receiving client 420. When a congestion notification message, i.e., the ECN bit setting, is detected on the IP layer 430 it has to be forwarded to an application layer 440 in a receiver 700 in the receiving client 420 as indicated by a connection 450. Upon reception of the congestion notification message, the receiver 700 in the receiving client 420 needs to transmit a request to a sender 800 in the sending client 470 requiring the sender to reduce its bit-rate, indicated by arrow 480. When that request arrives at the sender 800, it should immediately reduce the transmitted bit-rate to the receiver 700, as indicated by arrow 490. The amount of the reduction may be determined by the sender 800 which in turn can base its decision on a number of parameters.

For UDP based services, the inventors propose that guidance of bit-rate suitable for a session can be provided by adding a parameter determining a lower limit, below which a service is not seen to be usable. This can be done in the session set-up procedure using e g the Real Time Streaming Protocol (RTSP) or the Session Initiation Protocol (SIP), in which the embedded Session Description Protocol (SDP) already carries a bit-rate parameter, the b-parameter, which specifies the upper limit of the session bit-rate.

The inventors further suggest that the sender response to the reception of a congestion notification message can be based on an extended session set-up procedure. This procedure can be used to control the sender response to congestion notification messages in a way which takes previous actions on congestion notification messages into consideration and also enable general service requirements to impact the choice of sender actions.

Thus, according to embodiments of the present invention, two features are introduced in the real-time communication service:

1. Signaling of a session bit-rate range, i.e., between which rates is the service valid and between which rates the media sender is allowed to adapt during the session.

2. An adaptation mechanism that changes its behavior based on the relation between the current media transmission bit-rate or the current session bit-rate and the bit-rate range signaled in the session set-up.

The result will be that the sender determines its action to the congestion notification message based on what bit-rate it currently transmits at and where in the session bit-rate range it resides: The closer to the lower limit, the smaller response to the congestion message, the closer to the upper limit, the more drastic response to the congestion message. In this way, the more resource-consuming users in the same network priority class would respond with a greater bit-rate reduction than a user already transmitting close to his bottom limit for session continuity.

Figure 5:
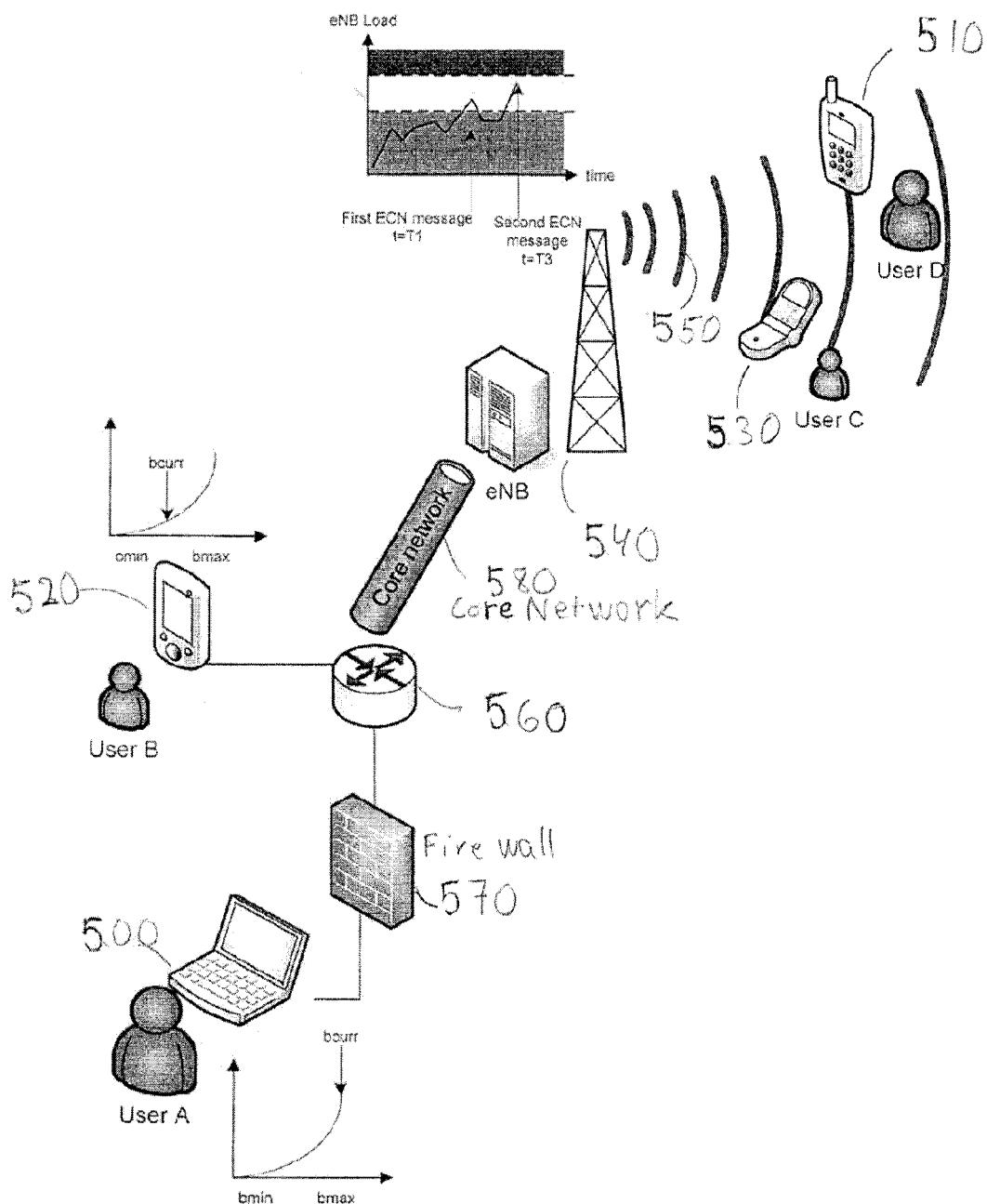
FIG. 5 is a schematic illustration of an embodiment of a system according to the invention.

FIG. 5 is a system according to one or more embodiments of the invention. For simplicity, an LTE environment is chosen for the description, but the invention is equally applicable to any packet-switched communication system employing communication services over a protocol that has no built in flow control. A first party, User A, using a first client 500, is communicating in a first session with a second party, User D, who uses a second client 530. The first client 500 is in this example connected through a firewall 570 to a shared resource 560. The shared resource 560 is in turn connected via a core network 580 to an eNB base station 540 to which the second client 530 is connected via a shared transmission channel 550. In a similar way a third party, User B, using a third client 520, is communicating in a second session with a fourth party, User C, who uses a fourth client 510. The third client 520 is also connected to the shared resource 560, and the fourth client 510 is also connected via the shared transmission channel 550 to the eNB base station 540. Clients can be for example a mobile terminal, a personal computer or a virtual client residing on a server.

On the first and the second clients 500 and 530 a first application is running, providing a first service to the involved parties User A and User D. On the third and the fourth clients 520 and 510 a second application is running, providing a second service to the involved parties User B and User C. Depending on the direction of the communication, the application that is running on the respective one of the clients may act as a sender 800 or as a receiver 700, as shown in FIG. 4.

For example, for communication from User A to User D, the first application running on the first client 500 acts as a sender 800 and the first application that is running on the second client 530 acts as a receiver 700, whereas for communication from User D to User A, the first application running on the second client 530 acts as a sender 800 and the first application that is running on the first client 500 acts as a receiver 700.

A first bit-rate range is determined to be valid for the first session and for the first application, i.e., needed for the service provided by the first application to function as intended during the first session, and a second bit-rate range is determined to be valid for the second session and for the second application, i.e., needed for the service provided by the second application to function as intended during the second session. A bit-rate range is or may be specified by an upper limit or end-point indicating a maximum bit-rate and a lower limit or end-point indicating a minimum bit-rate by which an application can operate to provide a usable service.

Figure 6:
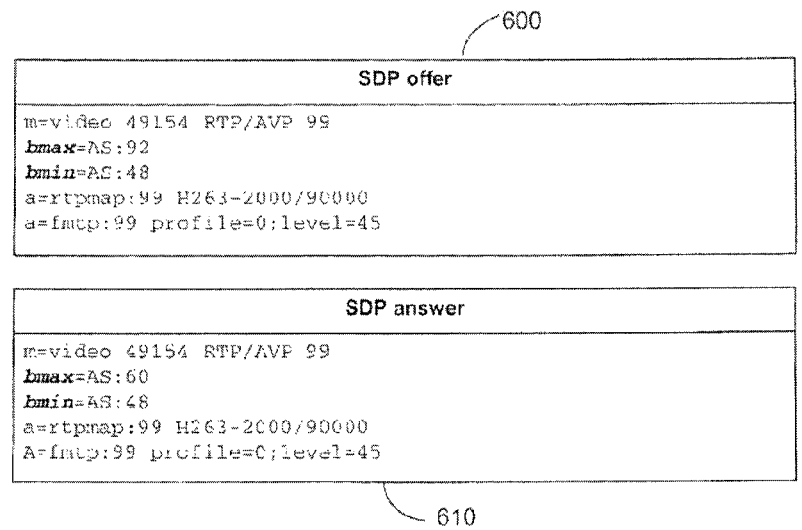
FIG. 6 is an illustration of an embodiment of a bit-rate range indication according to the invention.

One way of indicating this bit-range span or bit-rate range is shown in FIG. 6. In this example, the SDP is used to convey the valid bit-rate range in a session negotiation procedure. This is done by introducing, in addition to the existing upper limit for the session bit-rate, bmax, also a lower limit for the session bit-rate, bmin. The example shows that the offerer, i.e., the sender, supports a higher maximum bit-rate, indicated by bmax in SDP offer 600, than the receiver, whose maximum bit-rate is indicated by bmax in SDP answer 610, but both identify 48 kbps, indicated by bmin in SDP offer 600 and SDP answer 610 as the lower limit for the video in this session. This session would be run with a maximum bit-rate or upper limit of 60 kbps for the video and a minimum bit-rate or lower limit of 48 kbps.

Other means can also be used to convey the bit-rate range information. One possible alternative could be to have the bit-rate range specified in the application settings, or hard coded in the application.

In an environment where quality of service (QoS) mechanisms are available for the traffic, the lower and upper limits of the bit-rate range can be related to a specific QoS grant. A specific QoS scheme affects admission into the network and possibly also network resource reservations during the session. In 3GPP networks, the lower and upper limits could be related to the QoS attributes guaranteed bit-rate (GBR) and maximum bit-rate (MBR) respectively. However, this is not required and there might be occasions where the lower limit could be lower than GBR.

Figure 7:
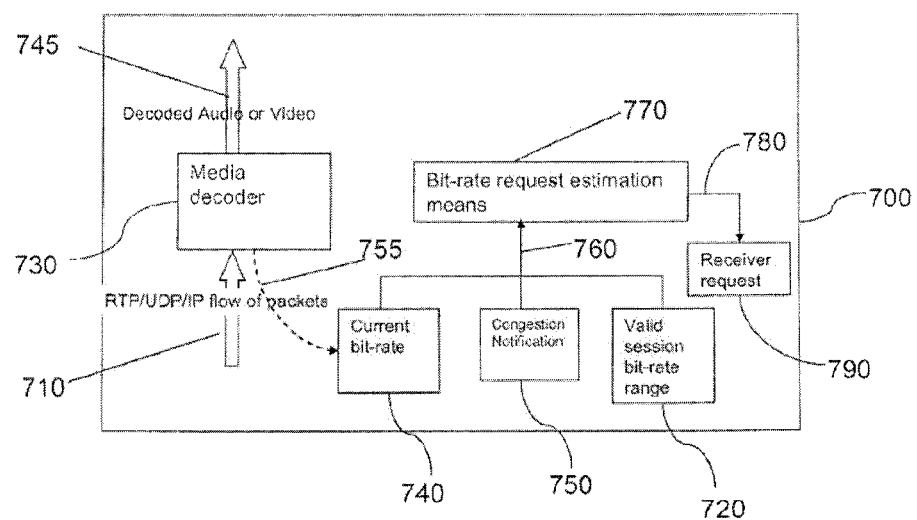
FIG. 7 is a schematic illustration of functionality blocks of an embodiment of a receiver according to the invention.
Figure 8:
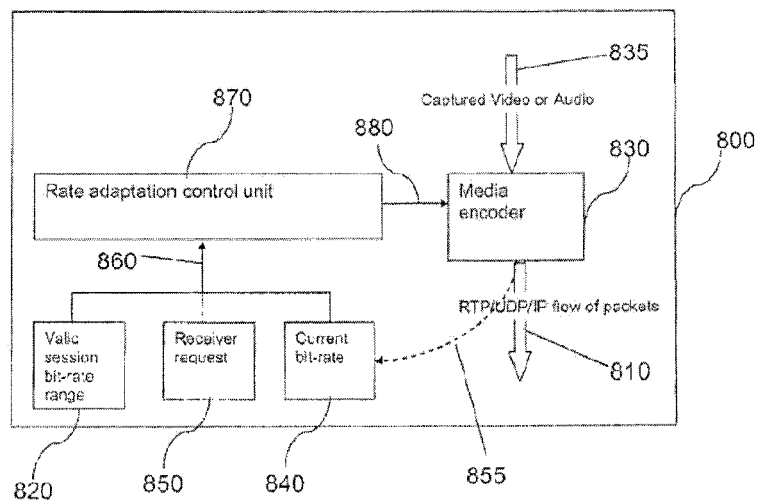
FIG. 8 is a schematic illustration of functionality blocks of an embodiment of a sender according to the invention.

As can be seen from FIGS. 7 and 8, where receiver 700 and sender 800 parts of an application are illustrated, the first application includes at least one first media encoder 830 and/or at least one first media decoder 730. Likewise, the second application includes at least one second media encoder 830 and/or at least one second media decoder 730. An application that resides on a server may have a media encoder, but no media decoder as such an application typically acts as a sender.

The first application further includes a first rate adaptation control unit 870 that is connected to the at least one first media encoder 830 and that serves to control the rate, e g bit rate, of the at least one first media encoder 830. Similarly, the second application further includes a second rate adaptation control unit 870 that is connected to the at least one second media encoder 830 and that serves to control the rate, e g bit rate, of the at least one second media encoder 830. The first rate adaptation control unit 830 thereby also serves to control the rate, e g bit rate, of the first session, and the second rate adaptation control unit 830 serves to control the rate, e. g., bit rate, of the second session, as the rate or bit-rate of a session is determined by the rate at which the media flow of packets is output from the at least one media encoder 830.

The first rate adaptation control unit 870 has been configured to compare a first current bit-rate that is currently used in the first session or by the at least one first media encoder 830 to said first bit-rate range to determine a first distance to a limit or end-point of the first bit-rate range, i.e., to the upper limit or to the lower limit of the first bit-rate range, and the second rate adaptation control unit 870 has been configured to compare a second current bit-rate that is currently used in the second session or by the at least one second media encoder 830 to said second bit-rate range to determine a second distance to a limit or end-point of the second bit-rate range, i.e., to the upper limit or to the lower limit of the second bit-rate range. The first and second rate adaptation control units 870 are further configured to adapt the first current bit-rate and second current bit-rate differently depending on the first and second distance, i.e., to adapt the respective bit-rates by amounts that depend on the size of the respective distance. The rate adaptations may be performed in order to alleviate or reduce congestion in the shared resource 560 and/or the shared transmission channel 550.

The first and second rate adaptation control units 870 are, or may be, triggered by a rate adaptation request message 480 to perform rate adaptation control and issue a rate control command 880 to the at least one first and at least one second media encoder 830 respectively. The rate adaptation request message may be sent, e. g., by the receiver 700, i.e., by the application that receives the media that has been encoded by the respective at least one first and at least one second media encoder 830. The rate adaptation request message 480 may further specify a requested or suggested rate or bit-rate adaptation, e g expressed as a relative change or a difference to the current bit-rate, or as a new or adapted bit-rate, to be used for the transmission in the respective session. The bit-rate adaptation may be estimated by the receiver 700 so that the currently received bit-rate will be reduced more if it is closer to the upper limit of the bit-rate range than if it is closer to the lower limit of the bit-rate range valid for the respective session.

The rate-control mechanism utilizes the knowledge of the valid bit-rate range for the media type as well as the current value of the transmitted bit-rate. This mechanism will now be described in more detail with reference to FIGS. 4 and 7-9. FIGS. 7 and 8 illustrate some parts of a sender—receiver pair of an application where the rate-control mechanism is implemented. At least some of these parts, such as rate adaptation control units 870 and 970, bit rate request estimation means 770, rate request means 790, rate request reception means 850, detection means 750, bit-rate range determining means 720 and 820, bit-rate determining means 740 and 840, Packet Loss Rate (PLR) determining means 905, Jitter determining means 915, Application settings determining means 920 and Network Feedback (NF) determining means 940 may for example be implemented in form of memories from which information can be read out and/or processors that perform processing of information to produce a result that can be used in the rate adaptation.

FIG. 7 shows a block scheme of a receiver 700 that is configured to provide a service by receiving packet-switched encoded media 710 that is transmitted by a sender 800 in a session via a shared resource 400. The receiver 700 includes bit-rate range determining means 720 for determining a valid session bit-rate range within which a bit-rate applied for transmission of the encoded media must fall for the service to be working as intended, e g in that the service provides sufficient media quality. The valid session bit-rate range can be specified by an upper limit or end-point and a lower limit or end-point. Further, the receiver 700 comprises at least one media decoder 730 for decoding said encoded media at a currently received bit-rate to output decoded media 745, e g audio or video, and detection means 750 for detecting a congestion notification message from the shared resource and bit-rate determining means 740 for determining the currently received bit-rate. The currently received bit-rate may be determined from the IP flow of encoded media 710 that is input to the media decoder 730 as indicated by dashed arrow 755, e. g., by monitoring the IP flow and estimating a mean value for the currently received bit-rate. It can also be determined from other means available in the client where the receiver 700 resides. Information on valid session bit-rate range, currently received bit-rate and the congestion notification message is provided on an input 760 to bit-rate request estimation means 770 for estimating a bit-rate adaptation by comparing the currently received bit-rate to the valid session bit-rate range to determine a distance to a limit, i e to the upper limit or to the lower limit, of the valid session bit-rate range and estimating the bit-rate adaptation differently depending on the distance. The bit-rate adaptation depends on the distance, so that the bit-rate adaptation is larger if the distance is small and smaller if the distance is large. The estimation of a bit-rate adaptation may be done in response to a congestion notification message but could also be triggered by other messages or situations. The estimated bit-rate adaptation, which may be expressed as a relative change or a difference to the currently received bit-rate, or as a requested transmitted bit-rate, is then output on line 780 to rate request means 790. In a first embodiment, the rate request means 790 then requests the sender 800 to adapt its currently transmitted bit-rate of the encoded media by sending a rate adaptation request 480 to the sender 800. The rate adaptation request 480 may further include the estimated bit-rate adaptation to be used as an input by the sender 800 for determining a new transmitted bit-rate, i.e., an adapted bit rate, of the encoded media 490, 810.

However, in a second embodiment, the rate adaptation request 480 may be interpreted by the sender 800 as an instruction or order to adjust the currently transmitted bit-rate as specified by the estimated bit-rate adaptation included in the rate adaptation request 480.

In yet another, third embodiment, the rate adaptation request 480 sent by the receiver 700 does not include any estimated bit-rate adaptation. This third embodiment requires that the sender 800 includes bit-rate estimation means, for estimating a bit-rate adaptation. Further, it is possible, but not necessary in the third embodiment that the receiver 700 includes bit-rate estimation means 770 and estimates a bit-rate adaptation.

FIG. 8 shows a block scheme of a sender 800 that is configured to provide a service by transmitting packet-switched encoded media 810 in a session via a shared resource 400 to a receiver 700. The sender 800 includes bit-rate range determining means 820 for determining a valid session bit-rate range within which a bit-rate applied for transmission of the encoded media 810 must fall for the service to be working as intended, e. g., in that the service provides sufficient media quality, and at least one media encoder 830 for receiving media 835 that is input to the media encoder, e. g., captured audio or video, and encoding the media at a currently transmitted bit-rate. Further, the sender 800 includes rate request reception means 850 for receiving requests from the receiver 700 to adapt the currently transmitted bit-rate of the encoded media and bit-rate determining means 840 for determining the currently transmitted bit-rate. The currently transmitted bit-rate may be determined from the settings in the media encoder 830 or from the IP flow of encoded media 810 that is output from the media encoder 830 as indicated by dashed arrow 855, but can also be determined from other means available in the client where the sender 800 resides. Information on valid session bit-rate range, currently transmitted bit-rate and the requests 480 from the receiver is provided on an input 860 to a rate adaptation control unit 870. The requests 480 may further include an estimated bit-rate adaptation made by the receiver 700 to be used as an input by the sender 800 for determining a new transmitted bit-rate, i.e., an adapted bit rate, of the encoded media 810. The rate adaptation control unit 870 determines a rate adaptation to be made based on the information provided on the input 860 and outputs a rate control command on an output 880 to instruct the media encoder 830 to change the currently transmitted bit-rate into an adapted bit-rate within the valid session bit-rate range. The media encoder 830 then changes its transmission or output of encoded media 810 from the currently transmitted bit-rate to the adapted bit-rate. The rate adaptation control unit 870 may determine a rate adaptation to be made and/or output a rate control command to the media encoder in response to a request 480 from the receiver 700 but it could also be triggered by other messages or situations.

Referring again to the third embodiment of the present invention, the bit-rate estimation means 770 are in this embodiment required in the sender 800 for estimating a bit-rate adaptation as no such information is included in the rate adaptation request 480 sent by the receiver 700. The bit-rate estimation means may then preferably be included in the rate adaptation control unit 870 of the sender 800.

Figure 9:
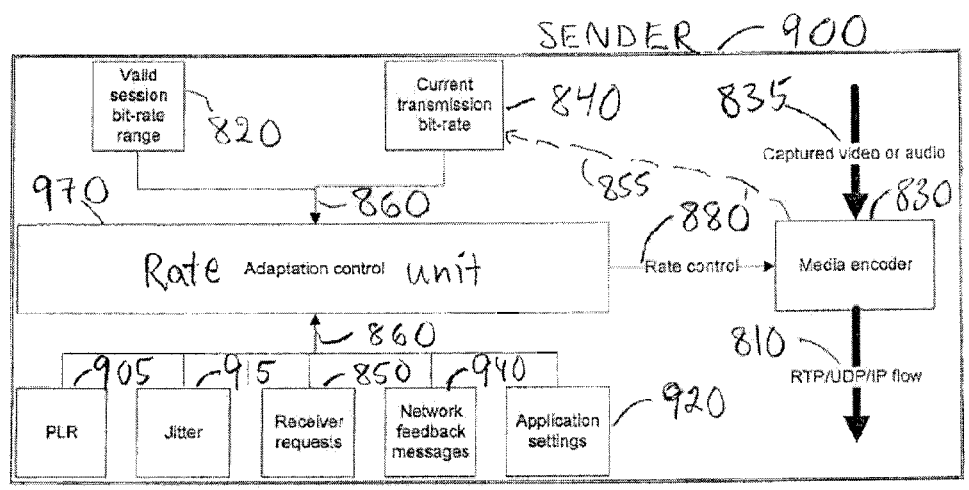
FIG. 9 is a schematic illustration of functionality blocks of an alternative embodiment of a sender according to the invention.

A rate adaptation mechanism for a media codec, i.e., a media encoder-decoder pair, can take into account a number of different measurement reports or session information parameters when determining the current optimal transmission bit-rate, i.e., the adapted bit-rate. This is illustrated in FIG. 9 that shows a sender 900 according to a fourth embodiment of the present invention. The overall function of the sender 900 in this embodiment is the same as that of the sender 800 in the first embodiment described with reference to FIG. 8. For components for which the description would be identical to that of FIG. 8, reference numerals are the same as in FIG. 8 and the description is not repeated here. A difference in this fourth embodiment is that the rate adaptation control unit 970 can take into account a variety of information types or parameters when determining a rate adaptation to be made, such as Packet Loss Rate (PLR) determined by PLR determining means 905, Jitter determined by Jitter determining means 915, Network Feedback (NF) messages determined by NF determining means 940 and Application settings determined by Application settings determining means 920. Network feedback information may regard a change in the Quality of Service parameters and Application settings information may be service preferences depending on mobile capabilities. The information regarding Packet Loss Rate (PLR), Jitter, Network feedback messages and Application settings can be determined or made available through different measurement reports or session information parameters and is provided to the rate adaptation control unit 970 on an input 860 together with the valid session bit-rate range determined by bit-rate range determining means 820, currently transmitted bit-rate determined by bit-rate determining means 840 and the requests received by rate request reception means 850 from the receiver 700, which requests may further include an estimated bit-rate adaptation. The rate adaptation control unit 870 then takes the variety of different information types or parameters and any estimated bit-rate adaptation from the receiver 700 into account for determining a rate adaptation to be made. As a consequence from considering more information in this way, the influence of the bit-rate adaptation estimated by the receiver 700 on the adapted bit-rate set by the sender 900 can be expected to become smaller.

Referring again to the second embodiment, the rate adaptation request may in this embodiment be interpreted by the sender as an instruction or order to adjust the currently transmitted bit-rate as specified by the estimated bit-rate adaptation included in the rate adaptation request. The bit-rate request estimation means 770 could in a variation of this embodiment be generalized to take into account a variety of information types or parameters when determining an estimated rate adaptation to be made, such as Packet Loss Rate (PLR), Jitter, Network feedback messages and Application settings.

To summarize, four embodiments of the rate adaptation control mechanism have been discussed:

1. The first embodiment: The receiver 700 estimates a bit-rate adaptation based on a currently received bit-rate 740 and a valid session bit-rate range 720 and sends a rate adaptation request 480 that may include the estimated bit-rate adaptation to the sender 800. The sender determines a new, adapted bit-rate for the transmission to the receiver. For the version when the estimated bit-rate adaptation is included the rate adaptation request from the receiver, the sender can choose whether to follow the bit-rate adaptation requested by the receiver or not.

2. The second embodiment: The receiver 700 estimates a bit-rate adaptation based on at least a currently received bit-rate 740 and a valid session bit-rate range 720 and determines the bit-rate adaptation to be performed. The receiver may further be generalized to take into account a variety of information types or parameters when determining the bit-rate adaptation to be made. The receiver sends a rate adaptation request 480 that specifies the bit-rate adaptation to the sender 800. The sender performs the bit-rate adaptation as instructed by the receiver.

3. The third embodiment: The receiver 700 sends a rate adaptation request 480 to the sender 800. The sender estimates a bit-rate adaptation based on a currently transmitted bit-rate 840 and a valid session bit-rate range 820 and determines a new, adapted bit-rate for the transmission to the receiver 700. The receiver may have estimated a bit-rate adaptation, possibly for other purposes than giving input to the sender, but it is not included in the rate adaptation request to the sender.

4. The fourth embodiment: The receiver 700 sends a rate adaptation request 480 to the sender 900 that may include a suggested bit-rate adaptation based on an estimated bit-rate adaptation performed by the receiver 700 based on a currently received bit-rate 740 and a valid session bit-rate range 720. The sender estimates a bit-rate adaptation based on a currently transmitted bit-rate 840 and a valid session bit-rate range 820 in addition to a variety of information types or parameters determined or made available through different measurement reports or session information parameters. If a suggested bit-rate adaptation is included in the rate adaptation request 480 it may also be used as an input or replace parts of the information, e g the currently transmitted bit-rate 840 and the valid session bit-rate range 820, considered by the sender 900 when determining the bit-rate adaptation to be performed.

Figure 10:
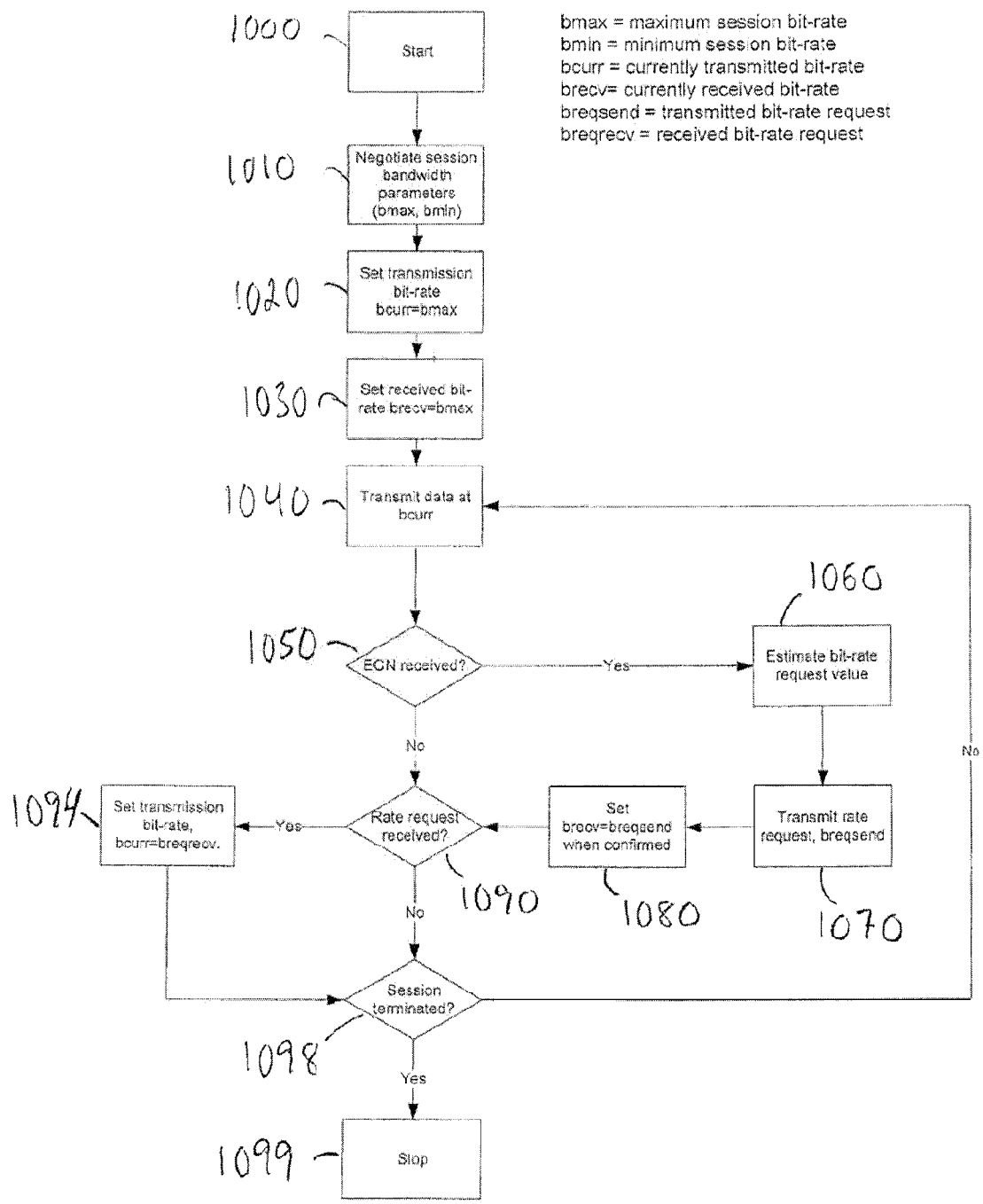
FIG. 10 is a flow chart of an embodiment of a rate control algorithm according to the invention.

FIG. 10 shows a flow chart of one example of a rate control algorithm that is running in an exemplary client with an application that may act as a receiver and a sender. The process starts at the set-up of a session in step 1000. First session bandwidth parameters are negotiated to determine a maximum session bit-rate bmax and a minimum session bit-rate bmin at step 1010. Then at 1020 a currently transmitted bit-rate bcurr is set to bmax or to a value lower than bmax. Thereafter a currently received bit-rate brecv is set to bmax or to a value lower than bmax at 1030. Data, e. g., encoded media, is then transmitted at the currently transmitted bit-rate bcurr at 1040. At 1050 the algorithm checks for reception of a congestion notification message. If no such message has been received, the algorithm proceeds to step 1090. If however it is determined that a congestion notification message has been received, a bit-rate request value, i.e., a bit-rate adaptation, is estimated at step 1060. Then at 1070 a rate request, i.e., a rate adaptation request, is transmitted to a sender in another client. The rate adaptation request may specify or suggest a bit-rate adaptation. In this example, the bit-rate adaptation is expressed as a transmitted bit-rate request breqsend. Then at 1080 the currently received bit-rate brecv is set to breqsend when it is confirmed, e g by analyzing received bit-rate, that the sender in the another client has adapted the transmitted bit-rate. In this example the sender in the another client adapts the transmitted bit-rate in accordance with the request by the receiver in the exemplary client. The process then proceeds to 1090, where the algorithm checks whether a rate request, i.e., a rate adaptation request, has been received from a receiver in the another client. If no such request has been received, the process proceeds to step 1098. If however it is determined that a rate request, i.e., a rate adaptation request, has been received, then at a step 1094 currently transmitted bit-rate bcurr is set or adapted to received bit-rate request breqrecv that has in this example been received in the rate request from the receiver in the another client. The process then continues at step 1098, where a check is made as to whether the session is terminated. If not, the process continues at step 1040, transmitting data at currently transmitted bit-rate bcurr. If on the other hand the session is terminated, the process stops at step 1099.

Figure 11:
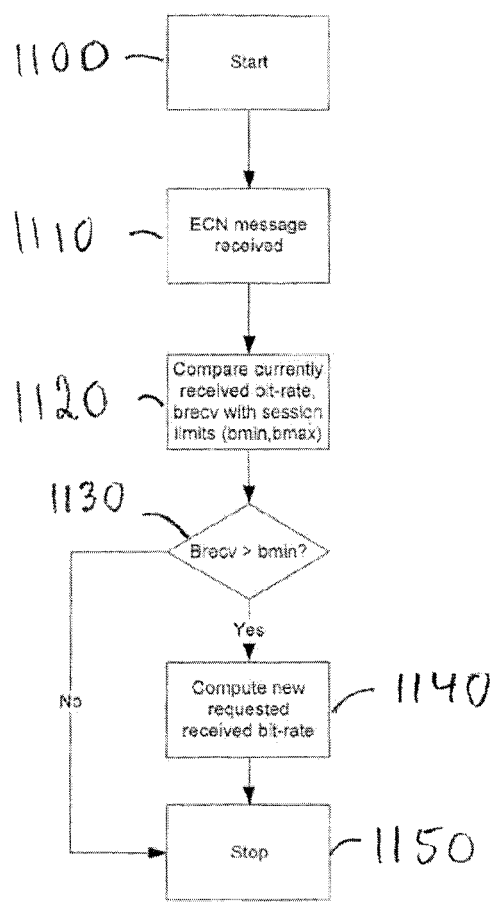
FIG. 11 is a flow chart of an embodiment of a bit-rate estimation part of a rate control algorithm according to the invention.

FIG. 11 shows a flow chart for the bit-rate estimation part done in step 1060 of the process shown in FIG. 10 in more detail. The process starts at step 1100. At step 1110 a congestion notification message, also called ECN message, is received e g from a shared resource. The message is conveyed by setting ECN bits in an IP header of a transmitted packet. Then at step 1120 a currently received bit-rate brecv is compared with a session upper limit or maximum session bit-rate bmax and a session lower limit or minimum session bit-rate bmin. Then, if it is determined in step 1130 that the currently received bit-rate brecv is greater than the session lower limit or minimum session bit-rate bmin, a new requested received bit-rate, i.e., a bit-rate adaptation expressed as a transmitted bit-rate request breqsend, is computed at 1140. The process then stops at 1150. If on the other hand, it is determined in step 1130 that the currently received bit-rate brecv is already at the session lower limit or minimum session bit-rate bmin, the process stops at 1150 and no further rate adaptation is performed.

Figure 12:
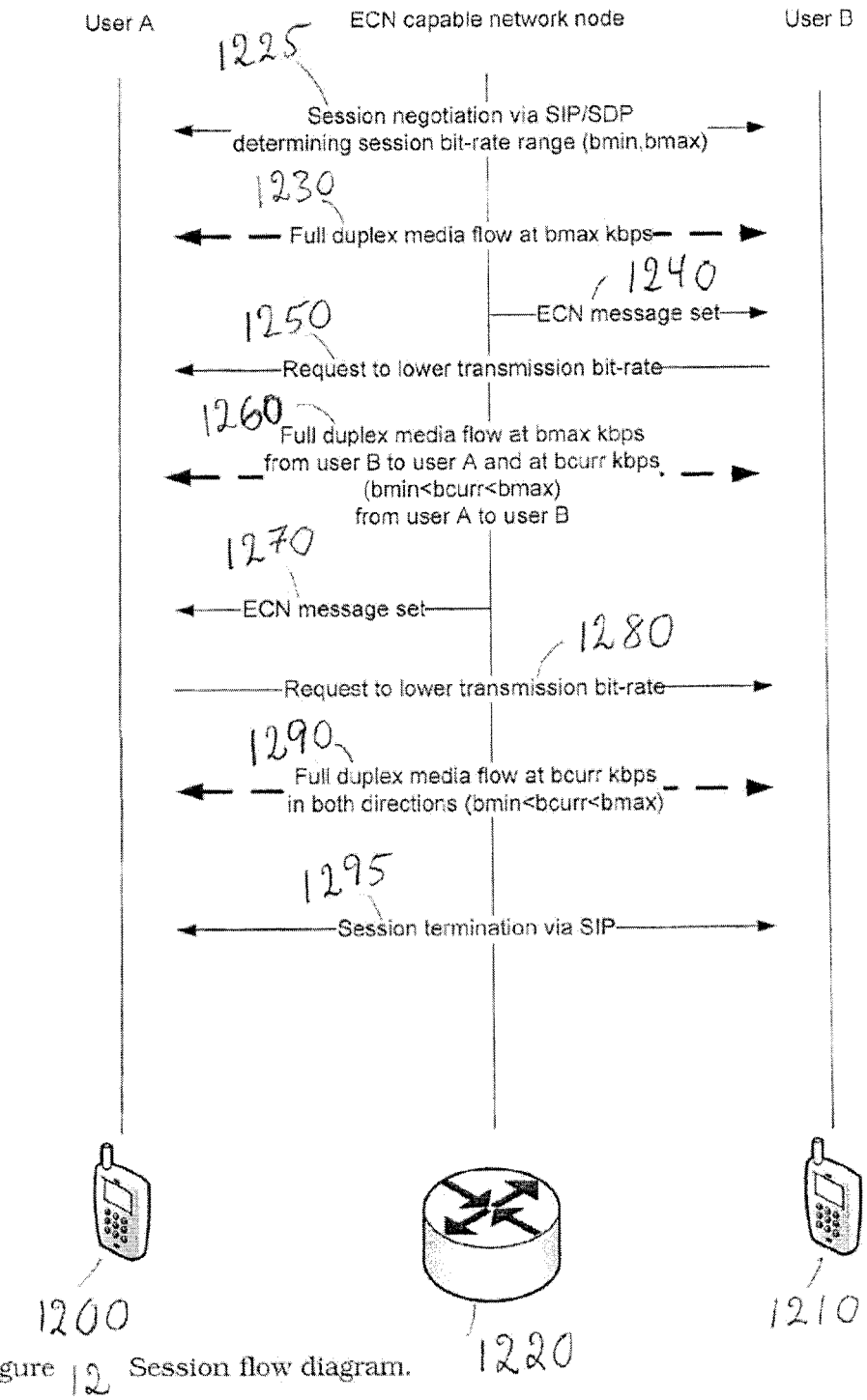
FIG. 12 is a flow diagram of an embodiment of a session flow between two users according to the invention.

FIG. 12 shows a session flow diagram for a User A 1200 and a User B 1210 that are communicating via an ECN capable network node that is a shared resource 1220. In a first step 1225 signalling messages are exchanged between User A and User B in a session negotiation procedure, e.g., via SIP/SDP, to determine a session bit-rate range specified by a session upper limit or maximum session bit-rate bmax kilobits per second (kbps) and a session lower limit or minimum session bit-rate bmin kbps. Then in a step 1230 a full duplex media flow is exchanged using a currently transmitted bit-rate bcurr which is set to maximum session bit-rate bmax for transmissions in both directions, i e from User A to User B and from User B to User A. In a next step 1240 the shared resource 1220 sends an ECN message to User B 1210, by setting ECN bits in an IP header of a transmitted packet. In step 1250 User B responds to the ECN message by sending a request, i.e., a rate adaptation request, to User A to lower its transmission bit-rate for transmissions to User B. User A then responds by adapting the transmission bit-rate for transmissions from User A to User B so that in step 1260 a full duplex media flow is exchanged between User A and User B at a currently transmitted bit-rate bcurr of maximum session bit-rate bmax from User B to User A and at a currently transmitted bit-rate bcurr which is in between the session lower limit or minimum session bit-rate bmin and the upper limit or maximum session bit-rate bmax from User A to User B. In a next step 1270 the shared resource 1220 sends an ECN message to User A 1200, by setting ECN bits in an IP header of a transmitted packet. In step 1280 User A responds to the ECN message by sending a request, i.e., a rate adaptation request, to User B to lower its transmission bit-rate for transmissions to User A. User B then responds by adapting the transmission bit-rate for transmissions from User B to User A so that in step 1290 a full duplex media flow is exchanged using a currently transmitted bit-rate bcurr which is in between the session lower limit or minimum session bit-rate bmin and the upper limit or maximum session bit-rate bmax for transmissions in both directions, i.e., from User A to User B and from User B to User A. Finally, in step 1295, signalling messages are exchanged between User A and User B to terminate the session, e.g., using the SIP protocol. In this example the users A and B have the same rate adaptation algorithm in their respective User Equipments, which means that when congestion occurs in the direction from A to B the bit-rate adaptation is the same as when congestion occurs in the direction from B to A. This need not be the case if the application settings or UE capabilities are different in the UE of User A than in the UE of User B.

The rate control mechanism can be applied to control the bit-rate of a media encoder as well as to control the bit-rate of a media flow on session level. For some applications using more than one media type, e g audio and video, the media flows of the different media types may be multiplexed or combined into one session media flow or IP transport flow that is sent in a session from a sender to a receiver. For such an application, the rate adaptation control unit can be configured to be applied on session level to control the bit-rate of the session media flow that is output for transmission from or via e g a multiplexer that receives as an input the encoded media flows that are output from the respective media encoders of different types. In a similar way, the bit-rate estimation means can be configured to estimate a bit-rate adaptation for a session media flow that consists of media flows of different media types.

The following example illustrates control of the bit-rate of media flows on session level for at least two applications each employing media of two different media types. However, the method and arrangement also applies for applications employing media of more than two different media types. In this example at least a first session for a first application and a second session for a second application have been set up for communication in a packet-switched communications system where multiple sessions for multiple parties that run applications can be set-up via a shared resource. A first encoded media flow of a first media type, e g audio, from a first media encoder and a second encoded media flow of a second media type, e g video, from a second media encoder are multiplexed by a first multiplexer into one first session media flow that is transmitted in the first session from a first sender to a first receiver. Further, a third encoded media flow of a third media type, e.g., voice, from a third media encoder and a fourth encoded media flow of a fourth media type, e g data, from a fourth media encoder are multiplexed by a second multiplexer into one second session media flow that is transmitted in the second session from a second sender to a second receiver. The first and second media encoders and the first multiplexer are or may be included in the first application, and the third and fourth media encoders and the second multiplexer are or may be included in the second application. The first application further includes a first rate adaptation control unit that is connected to the first and second media encoders and to the first multiplexer and that serves to control the rate, e g bit rate, of the first session media flow. Similarly, the second application further includes a second rate adaptation control unit that is connected to the third and fourth media encoders and that serves to control the rate, e.g., bit rate, of the second session media flow.

A first bit-rate range is determined to be valid for the first session and a second bit-rate range is determined to be valid for the second session. The first rate adaptation control unit has been configured to compare a first current bit-rate that is currently used in the first session to said first bit-rate range to determine a first distance to a limit or end-point of the first bit-rate range, i.e., to the upper limit or to the lower limit of the first bit-rate range, and the second rate adaptation control unit has been configured to compare a second current bit-rate that is currently used in the second session to said second bit-rate range to determine a second distance to a limit or end-point of the second bit-rate range, i.e., to the upper limit or to the lower limit of the second bit-rate range. The first and second rate adaptation control units are further configured to adapt the first current bit-rate and second current bit-rate differently depending on the first and second distance, i.e., to adapt the respective bit-rates by amounts that depend on the size of the respective distance.

Figure 13:
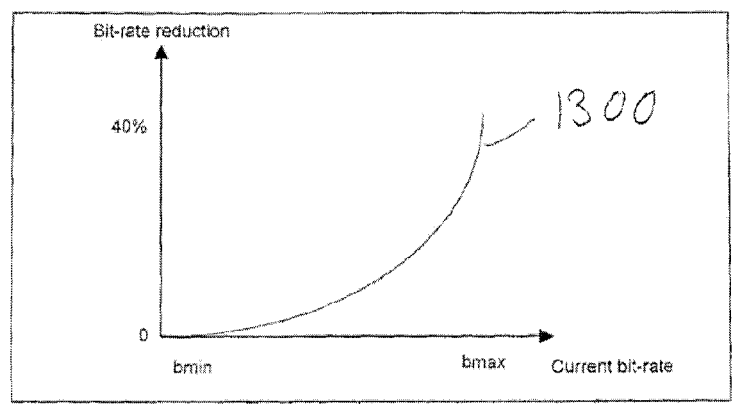
FIG. 13 is an illustration of one or more embodiments of weighting of a bit-rate adaptation according to the invention.

As mentioned earlier, the measure taken when receiving a congestion notification message is based on relating the congestion notification message with the current transmission bit-rate. The weighting of the congestion notification, i.e., the amount of bit-rate adaptation required from the sender as a response to the congestion notification, is done by investigating the relationship between the current bit-rate and the bit-rate range valid for the session. FIG. 13 shows an example weighting of ECN-triggered adaptive action based on current bit-rate and the session bit-rate range. In this example the weighting would give a 40% reduction in bit-rate when the current received bit-rate is equal to bmax and a zero reduction when the current received bit-rate has been reduced to bmin.

The bit-rate reduction estimation can be done in several different ways. Depending on the actual values (i.e. the width) of the bit-rate range different weightings would be suitable. An example exponential weighting formula is shown in Equation 1, showing an exponential weighting equation.

$$breqsend = \frac{3}{2e} e^{\frac{brecv-bmin}{bmax-bmin}} - 1 \quad \text{(Equation 1)}$$

This weighting would give an initial 50% reduction in bit-rate when the current received bit-rate is equal to bmax and a zero reduction if the session already is at bmin.

Figure 14:
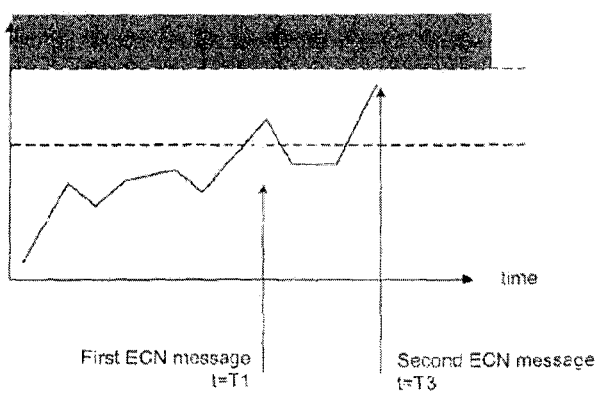
FIG. 14 is an illustration of a load level of a shared resource in of one or more embodiments of system according to the invention.

FIG. 14 illustrates in an LTE deployment, such as the system shown in FIG. 5, a load level on the enhanced NodeB (eNB) as a shared resource, i.e., providing a shared transmission channel, which may set the ECN bits. In the example, a weighting scheme giving a 50% reduction when running at bcurr=bmax and a 10% reduction when running at bcurr=0.5*bmax is used. The events shown in the below table take place:

| Time, t | Events |
| --- | --- |
| t = T0 | A session is established between users B and C. Transmission bit-rate from user B to C bcurr = bmax. |
| t = T1 | eNB experience congestion and sets ECN bits in IP flow going from B to C. User C receives ECN bits and transmit a 50% rate reduction request to B. B lowers its transmission bit-rate accordingly. |
| t = T2 | A new session is established between users A and D. Transmission bit-rate from user A to D, bcurr = bmax. Note that user B is still transmitting at 0.5*bmax. |
| t = T3 | eNB experience congestion and sets ECN bits in IP flow going from B to C and in flow going from A to D. User C receives ECN bits and transmit a 10% rate reduction request to B since B already is running at a reduced rate. B lowers its transmission bit-rate accordingly. User D also receives ECN bits but transmit a 50% rate reduction request to A since user A is transmitting at maximum session bit-rate and should therefore reduce by 50%. |
| t > T3 | Both sessions are now running at reduced rates but with similar quality. Slow upward adaptation could now start to try to restore session bit-rate at bmax. |

By taking the current bit-rate into account when determining the adaptive action, the client will take a greater responsibility to alleviate the congestion situation in the network if its current bit-rate is close to the upper limit of the session bit-rate range. In this way, the clients will distribute the adaptive actions in a fair way among themselves without punishing clients that already have taken a greater responsibility to alleviate congestion in the network. Further, it also has the benefit of distributing the functionality to the clients removing the requirement of user tracking and service awareness at the congested network node, e.g., eNB or a router. This scheme can be further extended to cope with different subscriber properties, e.g. "economy subscribers" and "gold subscribers", for example to require less bit-rate adaptation from "gold subscribers", e g subscribers that pay more for the service, than from "economy subscribers", e. g., subscribers that pay less for the service, and also with more absolute weighting, i e bit-rate adaptation expressed in absolute bit-rate amount or bit-rate adaptation to a specified bit-rate value if current bit-rate is above this value, based on the absolute value of the current bit-rate, not only the relative value to the session bit-rate range. Combinations of absolute and relative weighting are also conceivable, e.g., always reduce to an absolute bit-rate value if current bit-rate is above this value, then reduce by amounts that relate current bit-rate to a limit of the bit-rate range.

One advantage of at least some embodiments of this invention is that they solve the problem of unfair responsibility between clients in a congested network node to alleviate congestion. Without this functionality, both the user which already has adapted to network congestion as well as the new user which hasn't reduced the bandwidth consumption will be required to reduce their transmission bit-rate in an equal way. In the case of a newly established session, which has not taken any congestion-alleviate action, the user will suffer much less media quality reduction compared to a client which already has reduced its bit-rate due to previous congestion notification messages.

With this functionality, on the other hand, the responsibility is shared in a more fair way with a common way of progressive actions to alleviate congestion the closer the user is to the upper session bit-rate limit.

Although the rate adaptation mechanism of the present invention has been described as a response to a congestion notification message issued by a shared resource to a receiver of a packet-switched media stream that is transmitted via the shared resource, it is equally applicable also in other circumstances where source data or media subject to real-time transmission requirements is transmitted over a packet-switched network from a sender to a receiver and where the receiver of the source data or media needs to request an adaptation of the transmission rate from the sender of the source data or media. For example, the rate adaptation mechanism can be invoked by a congestion notification message on another layer or by another message than a congestion notification message received from the shared resource. One such message could be a "congestion alleviated" message, in which case the rate adaptation mechanism can be used to increase the transmission rate in a balanced way. For example, this can be done so that parties that have experienced the greatest reductions in bit-rate get greater increases than parties for which smaller bit-rate reductions have been done. This means that the current bit-rate, or the currently transmitted bit-rate, would be increased more if it is closer to the lower limit of the bit-rate range than if it is closer to the upper limit of the bit-rate range. Further, estimation of bit-rate adaptation would be done so that the currently received bit-rate is increased more if it is closer to the lower limit of the bit-rate range than if it is closer to the upper limit of the bit-rate range.

The message can also be received from another network resource that has good knowledge about the network conditions, meaning for example that another node sets the ECN bits.

The invention claimed is:

1. A method for controlling a bit-rate of a session between a sender and a receiver in a packet-switched communications system where multiple sessions are set-up via a shared resource, the method performed at the sender and comprising:
    determining a bit-rate range valid for the session, the bit-rate range having an upper limit and a lower limit;
    receiving a rate adaptation request message from the receiver;
    comparing a current bit-rate of the session to the bit-rate range;
    adapting the current bit-rate based on the comparison to the bit-rate range so that the current bit-rate is reduced more when the current bit-rate is closer to the upper limit of the bit-rate range than when the current bit-rate is closer to the lower limit of the bit-rate range, or so that the current bit-rate is increased more when the current bit-rate is closer to the lower limit of the bit-rate range than when the current bit-rate is closer to the upper limit of the bit-rate range.

2. The method according to claim 1 wherein the receiver sends the rate adaptation request message upon reception of a message from a network resource.

3. The method according to claim 2 wherein the message from the network resource is a congestion notification message.

4. The method according to claim 2 wherein the network resource is the shared resource.

5. The method according to claim 1 wherein determining a bit-rate range valid for the session further comprises signaling the bit-rate range in a set-up procedure for the session.

6. The method according to claim 1 wherein the User Datagram Protocol with Explicit Congestion Notification is used for communication in the session.

7. The method according to claim 1 wherein the upper limit and the lower limit for the bit-rate range are related to a specific Quality of Service grant for the session.

8. The method according to claim 1 wherein adapting the current bit-rate based on the comparison to the bit-rate range further comprises adapting the current bit-rate by an amount that depends on subscriber properties.

9. The method according to claim 1 wherein adapting the current bit-rate based on the comparison to the bit-rate range further comprises adapting the current bit-rate by an absolute amount or to a specified bit-rate value if the current bit-rate is above the specified bit-rate value.

10. A receiver for receiving packet-switched encoded media that is transmitted by a sender in a session via a shared resource, the receiver comprising:
    a bit-rate range determining processor circuit configured to determine a bit-rate range valid for the session, the bit-rate range having an upper limit and a lower limit;
    a bit-rate request estimation processor circuit configured to estimate a bit-rate adaptation by comparing a currently received bit-rate to the bit-rate range and estimating the bit-rate adaptation based on the comparison to the bit-rate range so that the currently received bit-rate is reduced more when the currently received bit-rate is closer to the upper limit of the bit-rate range than when the currently received bit-rate is closer to the lower limit of the bit-rate range, or so that the currently received bit-rate is increased more when the currently received bit-rate is closer to the lower limit of the bit-rate range than when the currently received bit-rate is closer to the upper limit of the bit-rate range; and
    a rate request processor circuit configured to request the sender to adapt a currently transmitted bit-rate in the session.

11. The receiver according to claim 10 wherein the bit-rate request estimation processor circuit is configured to take at least one information type out of Packet Loss Rate, Jitter, Network Feedback messages, and Application settings into account for estimating the bit-rate adaptation.

12. The receiver according to claim 10 further comprising:
    a detection processor circuit configured to detect a message from a network resource; and
    wherein the bit-rate request estimation processor circuit estimates the bit-rate adaptation upon detection of the message from the network resource.

13. The receiver according to claim 12 wherein the message from the network resource is a congestion notification message.

14. The receiver according to claim 12 wherein the network resource is the shared resource.

15. The receiver according to claim 10 wherein the rate request processor circuit is configured to include the bit-rate adaptation when requesting the sender to adapt a currently transmitted bit-rate in the session.

16. The receiver according to claim 10 further comprising at least one media decoder for decoding the encoded media received in the session.

17. A sender for transmitting packet-switched encoded media in a session via a shared resource to a receiver, the sender comprising:
    a bit-rate range determining processor circuit configured to determine a bit-rate range valid for the session, the bit-rate range having an upper limit and a lower limit;
    a rate request reception processor circuit configured to receive a request from the receiver to adapt a currently transmitted bit-rate in the session; and a rate adaptation control unit configured to, in response to the request from the receiver, control a rate adaptation of the currently transmitted bit-rate in the session so that the currently transmitted bit-rate is reduced more when the currently transmitted bit-rate is closer to the upper limit of the bit-rate range than when the currently transmitted bit-rate is closer to the lower limit of the bit-rate range, or so that the currently transmitted bit-rate is increased more when the currently transmitted bit-rate is closer to the lower limit of the bit-rate range than when the currently transmitted bit-rate is closer to the upper limit of the bit-rate range.

18. The sender according to claim 17 wherein the request to adapt a currently transmitted bit-rate is sent by the receiver upon reception of a message from a network resource.

19. The sender according to claim 18 wherein the message from the network resource is a congestion notification message.

20. The sender according to claim 18 wherein the network resource is the shared resource.

21. The sender according to claim 17 wherein the rate adaptation control unit is configured to determine the rate adaptation of the currently transmitted bit-rate in the session by comparing the currently transmitted bit-rate to the bit-rate range.

22. The sender according to claim 17 wherein an estimated bit-rate adaptation is included in the request from the receiver to adapt the currently transmitted bit-rate, and wherein the rate adaptation control unit is configured to use the estimated bit-rate adaptation as an input for determining the rate adaptation of the currently transmitted bit-rate in the session.

23. The sender according to claim 17 wherein the rate adaptation control unit is configured to take at least one information type out of Packet Loss Rate, Jitter, Network Feedback messages, and Application settings into account for estimating the rate adaptation.

24. The sender according to claim 17 further comprising at least one media encoder configured to output the encoded media to be transmitted in the session.

25. A packet-switched communications system for controlling bit-rates of at least a first and a second session, the system comprising at least a first sender operable to communicate with a first receiver via a shared resource in the first session and a second sender operable to communicate with a second receiver via the shared resource in the second session, the system further comprising:
a first bit-rate range determining processor circuit configured to determine a first bit-rate range valid for the first session, the first bit-rate range having an upper limit and a lower limit;
a second bit-rate range determining processor circuit configured to determine a second bit-rate range valid for the second session, the second bit-rate range having an upper limit and a lower limit;
a first rate adaptation control unit configured to control rate adaptation of a first current bit-rate of the first session so that the first current bit-rate is reduced more when the first current bit-rate is closer to the upper limit of the first bit-rate range than when the first current bit-rate is closer to the lower limit of the first bit-rate range, or so that the first current bit-rate is increased more when the first current bit-rate is closer to the lower limit of the first bit-rate range than when the first current bit-rate is closer to the upper limit of the first bit-rate range; and
a second rate adaptation control unit configured to control rate adaptation of a second current bit-rate of the second session so that the second current bit-rate is reduced more when the second current bit-rate is closer to the upper limit of the second bit-rate range than when the second current bit-rate is closer to the lower limit of the second bit-rate range, or so that the second current bit-rate is increased more when the second current bit-rate is closer to the lower limit of the second bit-rate range than when the second current bit-rate is closer to the upper limit of the second bit-rate range.

26. The system according to claim 15 wherein the first and second rate adaptation control units are triggered by the reception of a rate adaptation request message.

* * * * *

UNITED STATES PATENT AND TRADEMARK OFFICE
CERTIFICATE OF CORRECTION

PATENT NO.        : 8,942,243 B2
APPLICATION NO.   : 14/106594
DATED             : January 27, 2015
INVENTOR(S)       : Wanstedt et al.

It is certified that error appears in the above-identified patent and that said Letters Patent is hereby corrected as shown below:

In the Specification

In Column 1, Lines 9-10, delete "filed Jul. 9, 2008," and insert -- filed Jul. 9, 2008, now Pat. No. 8,625,608, --, therefor.

In Column 8, Line 64, delete "adaptation control unit 830" and insert -- adaptation control unit 870 --, therefor.

In Column 8, Line 66, delete "adaptation control unit 830" and insert -- adaptation control unit 870 --, therefor.

Signed and Sealed this
Twelfth Day of January, 2016

Michelle K. Lee
*Director of the United States Patent and Trademark Office*